(12) United States Patent
Tao et al.

(10) Patent No.: US 9,942,489 B2
(45) Date of Patent: Apr. 10, 2018

(54) ADAPTIVE TONE MAPPING BASED ON LOCAL CONTRAST

(71) Applicant: Samsung Electronics Co., Ltd., Suwon-si (KR)

(72) Inventors: Li Tao, Mountain View, CA (US); Yeong-Taeg Kim, Mountain View, CA (US)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 103 days.

(21) Appl. No.: 14/986,557

(22) Filed: Dec. 31, 2015

(65) Prior Publication Data

US 2016/0360173 A1 Dec. 8, 2016

Related U.S. Application Data

(60) Provisional application No. 62/170,042, filed on Jun. 2, 2015.

(51) Int. Cl.

| G09G 5/02 | (2006.01) |
|---|---|
| G09G 3/36 | (2006.01) |
| G06T 5/00 | (2006.01) |
| G06T 11/00 | (2006.01) |
| G06T 3/00 | (2006.01) |
| H04N 9/64 | (2006.01) |
| H04N 9/68 | (2006.01) |
| H04N 5/57 | (2006.01) |
| H04N 9/69 | (2006.01) |
| H04N 5/265 | (2006.01) |

(52) U.S. Cl.
CPC ............... *H04N 5/265* (2013.01); *H04N 9/68* (2013.01)

(58) Field of Classification Search
CPC combination set(s) only.
See application file for complete search history.

(56) References Cited

U.S. PATENT DOCUMENTS

| 2004/0075744 | A1* | 4/2004 | Newman | H04N 1/6072 |
| | | | | 348/207.1 |
| 2012/0242665 | A1* | 9/2012 | Peng | G06T 5/40 |
| | | | | 345/426 |
| 2013/0300835 | A1* | 11/2013 | Kinoshita | G09G 1/002 |
| | | | | 348/46 |
| 2013/0335438 | A1* | 12/2013 | Ward | G06T 5/40 |
| | | | | 345/589 |
| 2014/0002478 | A1* | 1/2014 | Ballestad | H04N 1/6027 |
| | | | | 345/589 |

(Continued)

*Primary Examiner* — Wesner Sajous (57) ABSTRACT

A method, apparatus, and non-transitory computer readable medium for video tone mapping. The method includes processing a video using at least first and second tone mapping functions to generate at least first and second tone mapped videos and identifying an amount of local contrast in one or more areas of each of the at least first and second tone mapped videos. The method further includes determining an amount of each of the at least first and second tone mapped videos to include in an output tone mapped video based at least in part on comparison of the identified amount of local contrast for each of the at least first and second tone mapped videos and generating the output tone mapped video in accordance with the determined amount of each of the at least first and second tone mapped videos.

20 Claims, 7 Drawing Sheets

(56) References Cited

U.S. PATENT DOCUMENTS

| | | | |
|---|---|---|---|
| 2014/0079334 A1* | 3/2014 | Verrall | H04N 5/2355 |
| | | | 382/274 |
| 2015/0078661 A1* | 3/2015 | Granados | G06T 5/009 |
| | | | 382/167 |
| 2016/0005349 A1* | 1/2016 | Atkins | H04N 5/20 |
| | | | 345/591 |
| 2016/0165120 A1* | 6/2016 | Lim | H04N 5/2355 |
| | | | 348/148 |

* cited by examiner

Tone mapping L

FIG. 4A

Tone mapping H

ADAPTIVE TONE MAPPING BASED ON LOCAL CONTRAST

CROSS-REFERENCE TO RELATED APPLICATION(S) AND CLAIM OF PRIORITY

The present application claims priority to U.S. Provisional Patent Application Ser. No. 62/170,042, filed Jun. 2, 2015, entitled "High Dynamic Range Tone Mapping". The content of the above-identified patent document is incorporated herein by reference.

The present application is related to U.S. patent application Ser. No. 14/992,961 filed Jan. 11, 2016, entitled "Tonal-Zone Adaptive Tone Mapping;" U.S. patent application Ser. No. 14/986,548 filed Dec. 31, 2015, entitled "Distribution-Point-Based Adaptive Tone Mapping;" and U.S. patent application Ser. No. 14/986,553 filed Dec. 31, 2015, entitled "Dual Band Adaptive Tone Mapping." The content of each of these patent documents is incorporated herein by reference

TECHNICAL FIELD

This disclosure relates generally to video tone processing. More specifically, this disclosure relates to adaptive tone mapping based on local contrast.

BACKGROUND

At a studio, users can produce mastered videos at using a mastering monitor to optimize or improve the luminance or brightness levels of the original videos. Often times, the mastering monitor used to master the video has different peak luminance or brightness levels than those of target displays upon which the videos are later displayed. Typically, the maximum luminance level of the mastering monitor is much larger than the maximum luminance level of the target display.

SUMMARY

This disclosure provides for adaptive tone mapping based on local contrast.

In one embodiment, a method for video tone mapping is provided. The method includes processing a video using at least first and second tone mapping functions to generate at least first and second tone mapped videos and identifying an amount of local contrast in one or more areas of each of the at least first and second tone mapped videos. The method further includes determining an amount of each of the at least first and second tone mapped videos to include in an output tone mapped video based at least in part on comparison of the identified amount of local contrast for each of the at least first and second tone mapped videos and generating the output tone mapped video in accordance with the determined amount of each of the at least first and second tone mapped videos.

In another embodiment an apparatus for video tone mapping is provided. The apparatus includes a memory and at least one processor operably connected to the memory. The at least one processor is configured to process a video using at least first and second tone mapping functions to generate at least first and second tone mapped videos and identify an amount of local contrast in one or more areas of each of the at least first and second tone mapped videos. The at least one processor is also configured to determine an amount of each of the at least first and second tone mapped videos to include in an output tone mapped video based at least in part on comparison of the identified amount of local contrast for each of the at least first and second tone mapped videos and generate the output tone mapped video in accordance with the determined amount of each of the at least first and second tone mapped videos.

In yet another embodiment, a non-transitory computer readable medium comprising program code for video tone mapping is provided. The program code, when executed by at least one processor, causes the at least one processor to process a video using at least first and second tone mapping functions to generate at least first and second tone mapped videos, identify an amount of local contrast in one or more areas of each of the at least first and second tone mapped videos, determine an amount of each of the at least first and second tone mapped videos to include in an output tone mapped video based at least in part on comparison of the identified amount of local contrast for each of the at least first and second tone mapped videos, and generate the output tone mapped video in accordance with the determined amount of each of the at least first and second tone mapped videos.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The ten "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Embodiments of the present disclosure recognize that displaying the mastered video at on a display with a maximum luminance level that is lower than the maximum luminance level in the mastered video can reduce the quality of the video. For example, portions of the mastered video with luminance levels greater than the maximum luminance level of the target display may be clipped or limited to the maximum luminance level of the target display, thereby limiting the range of luminance values of the video displayed.

Taking an example where a studio already mastered a movie with a mastering monitor having maximum luminance level of M-nit, a user may want the mastered video to have a different peak luminance level of N-nit for a target display where N<M. In such case, the user may need to re-master the original video file using a mastering monitor having a maximum luminance level of N-nit. Embodiments of the present disclosure recognize that this process can be time intensive and costly. In another example, the user may use a tone mapping method using already mastered video to generate a tone mapped video with algorithms or software that down tone maps from the higher mastering monitor luminance level to the lower target display luminance level. Embodiments of the present disclosure recognize that this process can produce unsatisfactory results, such as, saturation of highlighted objects or scenes.

Accordingly, various embodiments of the present disclosure produce a tone mapped video using adaptive tone mapping based on local contrast. In one or more embodiments, the adaptive tone mapping based on local contrast may reduce costs while providing improved video quality regarding saturation of highlighted objects or scenes.

One or more embodiments relate to processing images for improved rendering images on a display device. In one embodiment, a method comprises one or more applications of tone mapping of images, graphics, video frames, video scenes, and/or full videos (collectively referred to as "video" herein) to facilitate remastering content and/or to facilitate high dynamic range (HDR) display. For example, one or more embodiments are described herein that can facilitate HDR remastering to different luminance peak levels and/or that can facilitate tone mapping for a display having different luminance peak level than that of the mastering monitor. It will be appreciated that the various embodiments disclosed herein can be used either alone or in combination.

In the following, systems and methods are described in greater detail. The symbols p and q, in connection with knee mapping and/or mixed mapping, represent input luminance and target mapping luminance, respectively; the symbol MF, in connection with tone mapping with metadata, represents MaxFALL (maximum frame average luminance level); the symbols T, T1, and T2, in connection with ratio testing, represent predetermined contrast ratio of two different tone mapping results.

Figure 1:
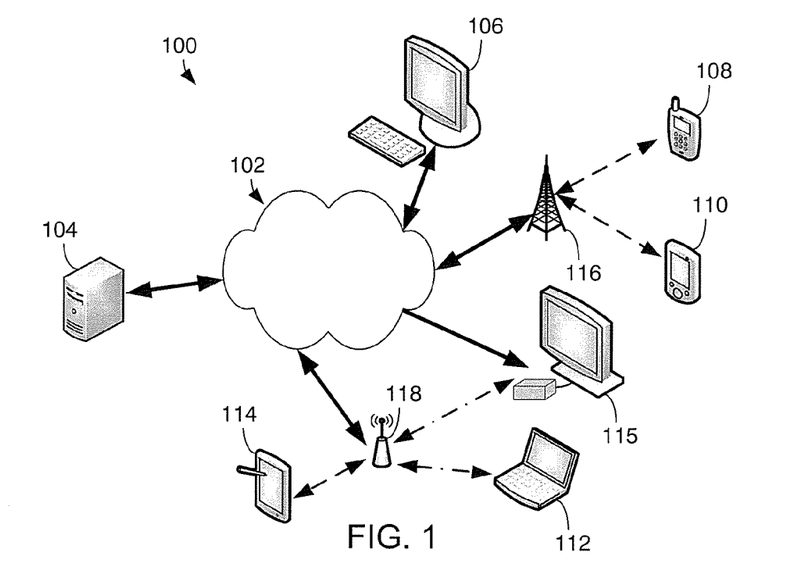
FIG. 1 illustrates an example computing system in which various embodiments of the present disclosure may be implemented.

FIG. 1 illustrates an example computing system 100 in which various embodiments of the present disclosure may be implemented. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100 on one or more communication channels. The network 102 may communicate Internet Protocol (IP) packets, frame relay frames, or other information between network addresses. The network 102 may include one or more local area networks (LANs): metropolitan area networks (MANs); wide area networks (WANs); all or a portion of a global network, such as the Internet; or any other communication system or systems at one or more locations.

In various embodiments, network 102 includes a broadcast and broadband networks and communication channels for communicating video data (e.g., video files including metadata and audio content) to client devices 106-115. The broadcasting elements of network 102, such as cable and satellite communication links, provide broadcast of video data to client devices 106-115. The broadband elements of network 102, Internet, wireless, wireline, and fiber optic network links and devices, provide for streaming and download of video data.

The network 102 facilitates communications between one or more servers 104 and various client devices 106-115. Each of the servers 104 includes any suitable computing or processing device that can provide computing services for one or more client devices. Each of the servers 104 could, for example, include one or more processing devices, one or more memories storing instructions and data, and one or more network interfaces facilitating communication over the network 102. For example, one or more of the servers 104 may include processing circuitry for mastering a video or for tone mapping a video based on local contrast, as discussed in greater detail below.

Each client device 106-115 represents any suitable computing or processing device that interacts with at least one server or other computing device(s) over the network 102. As will be discussed in greater detail below, the client devices 106-115 receive video (e.g., a mastered video file to be tone mapped or a tone mapped video file to be displayed) and may include processing circuitry for tone mapping a video based on local contrast. The client devices 106-115 each either includes or is connected to a display device for display of tone mapped video. In this example, the client devices 106-115 include a computer 106, a mobile telephone or smartphone 108, a personal digital assistant (PDA) 110, a laptop computer 112, tablet computer 114; and a set-top box and/or television 115. However, any other or additional client devices could be used in the communication system 100. In this example, some client devices 108-114 communicate indirectly with the network 102. For example, the client devices 108-110 communicate via one or more base stations 116, such as cellular base stations or an evolved Node B (eNodeBs). Also, the client devices 112-115 communicate via one or more wireless access points 118, such as IEEE 802.11 wireless access points. Note that these are for illustration only and that each client device could communicate directly with the network 102 or indirectly with the network 102 via any suitable intermediate device(s) or network(s). For example, in some embodiments, a mastered video file may be received by one or more of the client devices 106-115 on a computer readable medium instead over a wired or wireless communication link in the network 102.

Although FIG. 1 illustrates one example of a communication system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
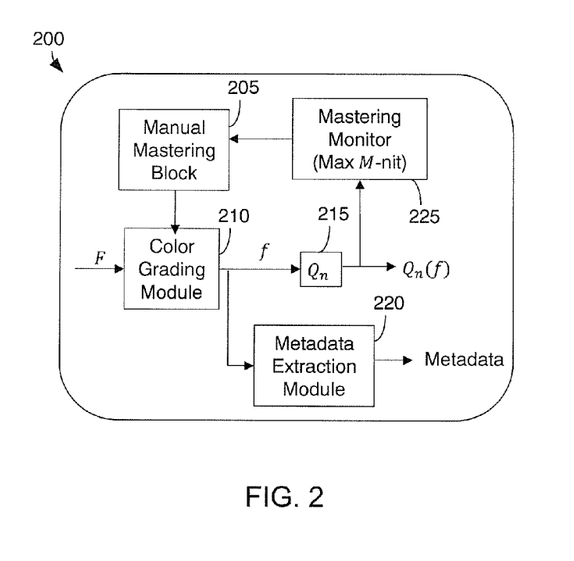
FIG. 2 illustrates a system for generating a mastered video that can be remastered according to embodiments of the present disclosure.

FIG. 2 illustrates a system 200 for generating a mastered video that can be remastered according to embodiments of the present disclosure. The embodiment of the mastered video generating system 200 shown in FIG. 2 is for illustration only. Other embodiments could be used without departing from the scope of the present disclosure. For example, the system 200 may be implemented by the server 104 or the client devices 106-115 in FIG. 1.

During manual mastering block 205, an input master video file F may be graded using a color grading module 210. As outputs, the color grading module 210 provides a mastered video file $f_M$, which is fed as an input to a quantizer $Q_n$ 215 and a metadata extraction module 220. The quantizer $Q_n$ 215 quantizes the mastered video file $f_M$ to produce an n-bit quantized mastered video file $Q_n(f_M)$. The associated maximum luminance level of the video file f is $L_{max}$ nit. The quantizer $Q_n$ 215 quantizes f into $2^n$ levels (i.e., n-bit long binary code) with a pre-determined quantization curve.

The metadata extraction module 220 generates metadata about the mastered video file, for example, maximum luminance level of the mastering monitor 225 (M), maximum content luminance level (MaxCLL) or brightness, MaxFALL, or other properties about the mastered video file. The files $f_M$ and $Q_n(f_M)$ as well as the metadata associated with the mastered video file are be stored in a storage device (e.g., such as storage device 915 in FIG. 9 discussed below) for transfer to and later display by a target display device (e.g., one of client devices 106-115).

A mastering monitor 225 de-quantizes the quantized mastered video file for display of the video on the mastering monitor 225. The de-quantization $Q_n^{-1}$ is the inverse operation of the quantization operation of the quantizer $Q_n$ 215. By displaying the mastered video, the mastering monitor 225 provides visual feedback for continued or iterative adjustment of color tones for the manual mastering block 205. However, the mastering monitor 225 may have very high contrast (e.g., has a maximum luminance level of M) in comparison with contrast available on a target display device (e.g., consumer-grade television sets, projectors, mobile phones, etc.) (e.g., having a maximum luminance level of N where M>N). As a result, the mastered video displayed on the mastering monitor 225 may look different than displayed on a target display device. For example, because the mastering monitor 225 can display brighter images than a typical home television set, the bright portions of the mastered video displayed on the home television set may clip and, thus, image details may be lost. For example, portions of in the mastered video having luminance levels above the maximum luminance level of the target display may all be displayed at the same luminance level (i.e., at the maximum luminance level of the target display).

Figure 3:
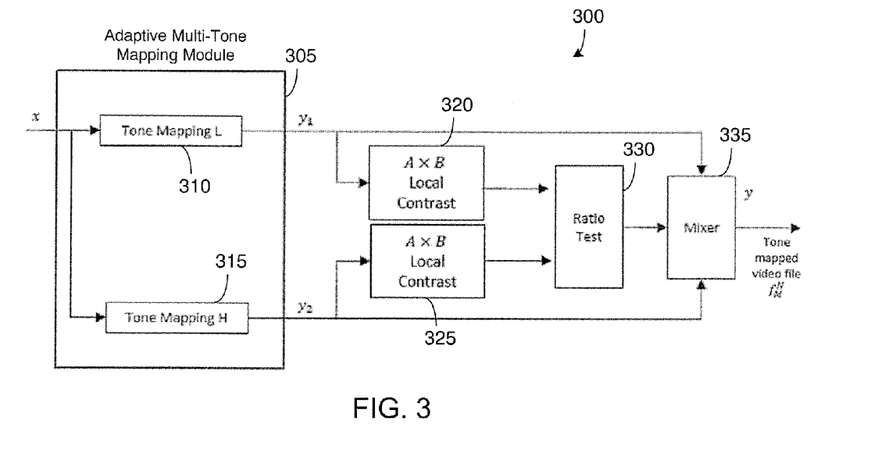
FIG. 3 illustrates a system for adaptive tone mapping based on local contrast comparison according to one embodiment of the present disclosure.

FIG. 3 illustrates a system 300 for adaptive tone mapping based on local contrast comparison according to one embodiment of the present disclosure. The system 300 may be implemented by the server 104 or the client devices 106-115 in FIG. 1. For example, any of the server 104 or the client devices 106-115 may implement the adaptive tone mapping based on local contrast techniques discussed herein to convert the mastered video file $f_M$ to the tone mapped video file $f_M^N$. In another example, the client devices 106-115 may receive the mastered video file $f_M$ from the server 104 and may implement the adaptive tone mapping based on local contrast techniques discussed herein to convert the received mastered video file $f_M$ to the tone mapped video file $f_M^N$. The embodiment of the adaptive tone mapping system 300 shown in FIG. 3 is for illustration only. Other embodiments could be used without departing from the scope of the present disclosure.

Various embodiments of the present disclosure apply a mix of two or more tone mappings to a video file. The system 300 provides adaptive tone mapping in order to remaster high contrast video or to display high contrast video which is to be displayed on lower contrast displays. For example, the video file may be a mastered video file $f_M$ that was mastered using a mastering process, such as implemented by system 200 discussed above. In another example the video file $f_M$ may be any video that has a maximum luminance level above a maximum luminance level of a target display on which the tone mapped video file $f_M^N$ is intended for display.

Figure 4A:
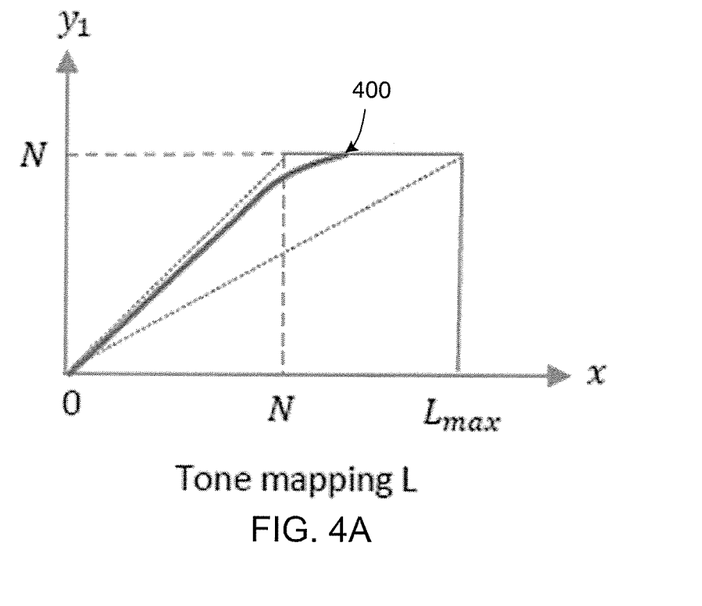
FIGS. 4A and 4B illustrate examples of tone mappings which may be utilized for tone mappings in one or more embodiments of the present disclosure.
Figure 4B:
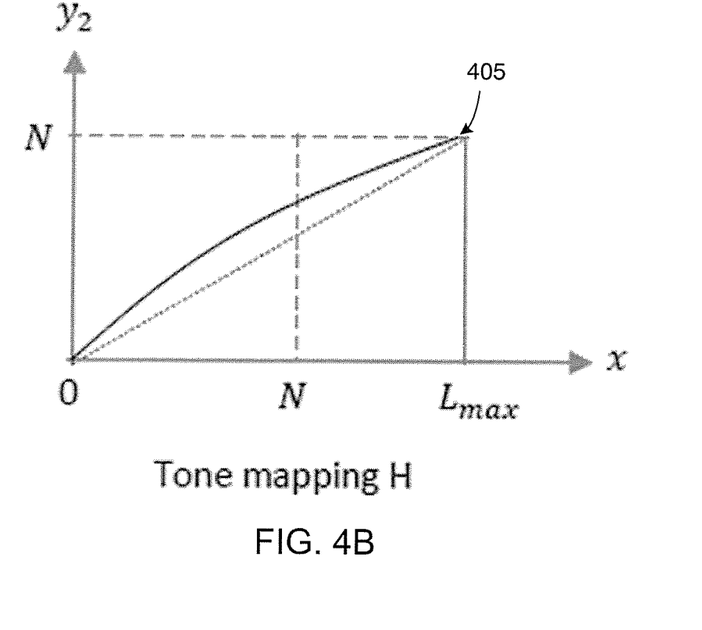

In this illustrative embodiment, the adaptive multi-tone mapping module 305 processes the video file using low and high tone mapping functions 310 and 315, respectively, to generate candidate tone mapped videos $y_1$ and $y_2$, respectively. Example of tone mappings 400 and 405 that may be utilized for the low and high tone mapping functions 310 and 315 are illustrated in FIGS. 4A and 4B. The example of tone mappings 400 and 405 shown in FIGS. 4A and 4B are for illustration only. Other embodiments could be used without departing from the scope of the present disclosure.

As illustrated in FIG. 4A, the low tone mapping 400 depicts a relationship between luminance values for the input video x having a maximum luminance value of $L_{max}$ and luminance values for the output video $y_1$ that is intended for display on a target display having a maximum luminance value of N. As depicted for this low tone mapping 400, certain high luminance values in the input video x are clipped or otherwise represented as the same luminance values in the output video $y_1$. As illustrated in FIG. 4B, the high tone mapping 405 depicts a relationship between luminance values for the input video x having a maximum luminance value of $L_{max}$ and luminance values for the output video $y_2$ that is intended for display on a target display having a maximum luminance value of N. As depicted for this high tone mapping 400, none of the luminance values in the input video x are clipped. The luminance values in the input video x are scaled or otherwise mapped to a luminance value in the output video $y_2$.

One or more example embodiments of the present disclosure recognize that a low tone mapping may expand shadow tones by compressing highlight tones, and a high tone mapping may provide more headroom for highlight tones by compressing lower tones (e.g., mid-tones and shadow tones). By mixing, an intermediate tone mapping can be achieved dynamically. The amount of mixing of the tone mappings is at least in part based on a measure of a comparison of the local contrast of the output of the different tone mappings.

Local contrast detectors 320 and 325 perform local contrast measurement on videos $y_1$ and $y_2$, respectively. For example, local contrast detectors 320 and 325 receive the candidate tone mapped videos $y_1$, $y_2$, respectively, as input and produces the local contrast measurements $\alpha_1$ and $\alpha_2$, respectively, as outputs. As used herein, the measured local contrast is a value for transitions of brightness in the one or more areas of an image or video frame. For example, local contrast may be a value for the sharpness or contrast within a portion of an image or frame. The portion or areas of the image or frame may be for local contrast detection may be selected as being areas of high contrast within the image or may be randomly selected areas of any suitable size or shape.

The local contrast detectors 320 and 325 can determine the measurement of the local contrast in a number of ways. For example, one way that local contrast detectors 320 and 325 perform local contrast measurement is based on removing a low-pass filtered version of the videos $y_1$ or $y_2$ of the tone mapping from the videos $y_1$ or $y_2$ (e.g., $y_1 - LPF(y_1)$ or $y_2 LPF(y_2)$). In another example, local contrast detectors 320 and 325 may generate a high-pass filtered version of the videos $y_1$ or $y_2$ of the tone mapping (e.g., $HPF(y_1)$ or $HPF(y_2)$). In each of these examples, the filtering may be performed on an area having a kernel size of A×B pixels (e.g., a size that is less that an entirety of a frame from the videos $y_1$ and $y_2$). In yet another example, local contrast detectors 320 and 325 may measure local contrast as a difference between a maximum and minimum luminance in the area of the video frame.

As disclosed herein, the mixing of the tone mappings is based at least in part of on a comparison of the measured local contrasts of the different tone mapped videos. For example, ratio test block 330 receives the local contrast measurements $\alpha_1$ and $\alpha_2$ of each of the tone mapped videos $y_1$ and $y_2$ and generates a mixing ratio γ as an output. The mixing ratio γ is used in determining the amount of influence or weighting of the respective candidate tone mapped videos in the output tone mapped video y. For example, the adaptive multi-tone mapping module 305 produce output videos $y_1$ to $y_n$ and the mixer 335 uses the mixing ratio γ to determine a weighted combination (e.g., convex combination) of the weighted output videos $y_1$ to $y_n$. For example, the output tone mapped video may be calculated according to equation 1 below:

$$y = c_1 y_1 + c_2 y_2 + c_n y_n \quad \text{[Equation 1]}$$

where the weights $c_1, c_2, \ldots, c_n$ are based on the mixing ratio γ and sum to unity. In various embodiments, the tone mapping with the highest local contrast is weighted more heavily in the final tone mapped output.

Figure 5A:
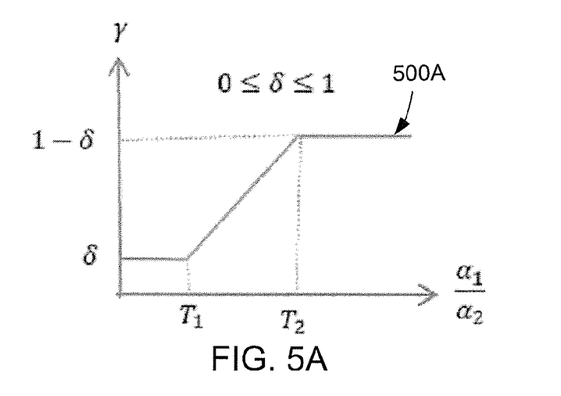
FIGS. 5A-5C illustrate graphs of example relationships between local contrast ratio and tone mapping function weighting according to embodiments of the present disclosure.
Figure 5B:
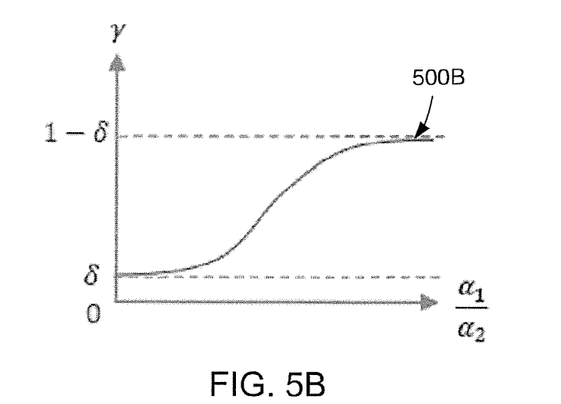
Figure 5C:
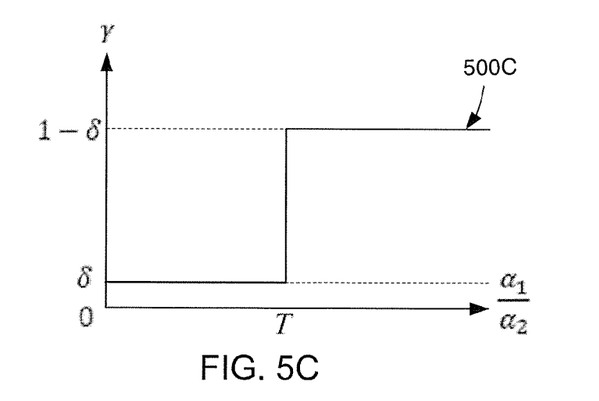

FIGS. 5A-5C illustrate graphs of example relationships between local contrast ratio $\alpha_1/\alpha_2$ and tone mapped video mixing ratio γ according to embodiments of the present disclosure. The example of relationships shown in FIGS. 5A-5C are for illustration only. Other embodiments could be used without departing from the scope of the present disclosure.

FIG. 5A depicts a linear relationship 500A between the local contrast ratio $\alpha_1/\alpha_2$ and tone mapped video mixing ratio γ with thresholds $T_1$ and $T_2$ for local contrast ratio for applying minimum and maximum mixing ratio γ values (e.g., δ and 1−δ), respectively. In this example embodiment, δ is value between 0 and 1. For example, if δ were equal to 0, for local contrast ratios above $T_2$ or below $T_1$, the mixing of the output videos $y_1$ and $y_2$ may involve including only one of the candidate videos $y_1$ and $y_2$ in the output video y and excluding the other. FIG. 5B depicts a non-linear relationship 500B between the local contrast ratio $\alpha_1/\alpha_2$ and tone mapped video mixing ratio γ. FIG. 5C depicts a step-function relationship 500C between the local contrast ratio $\alpha_1/\alpha_2$ and tone mapped video mixing ratio γ with threshold T for local contrast ratio for switching between applying minimum and maximum mixing ratio γ values (e.g., δ and 1−δ), respectively. In this example embodiment, δ is value between 0 and 1. For example, if δ were equal to 0, the mixing of the output videos $y_1$ and $y_2$ may involve including only one of the candidate videos $y_1$ and $y_2$ in the output video y and excluding the other based on whether the local contrast ratio is above or below T.

The mixer 335 receives the candidate tone mapped videos y1 and y2 and the ratio γ as inputs and generates the tone mapped video file $f_M^N$ as output. For example, the mixer 335 may combine or mix the candidate tone mapped videos y1 and y2 as a function of the calculated mixing ratio. In one example, the tone mapped output video may y be generated according to equation 2 as follows:

$$y = (1-\gamma)y_1 + \gamma y_2 \quad \text{[Equation 2]}$$

In one or more embodiments, the system 300 may make an initial selection of whether to apply these tone mapping techniques to the received video file. For example, the system 300 may determine whether or not HDR tone mapping should be applied instead of always applying tone mapping. In one example, the system 300 may identify $L_{max}$ of the received video (e.g., by accessing metadata of the video) and compare $L_{max}$ to at least one tone mapping criterion. For example, the tone mapping criterion may be the $L_{max}$ being greater than a maximum luminance of a target display (e.g., identified using metadata stored in firmware of the target display) plus an optional additional offset. Then, in response to satisfying the tone mapping criterion, system 300 determines to apply the corresponding tone mapping techniques as discussed above.

While the system 300 is depicted as selectively combining outputs of two tone mapping functions 310 and 315 any suitable number of tone mapping functions may be used. For example, as discussed above with regard to equation 1, the outputs of any number n of candidate tone mapped videos may be weighted based on local contrast ratios and combined to produce the output tone mapped video y. Additionally, the tone mapping techniques disclosed herein may be performed on a frame by frame basis, on a scene by scene basis, for the entire video file, any other suitable amount of a video, or for a single image. In one illustrative example, an entire scene may be tone mapped on a scene by scene basis using a single mixing ratio γ for the entire scene that is calculated using one or more frames of the scene.

Figure 6:
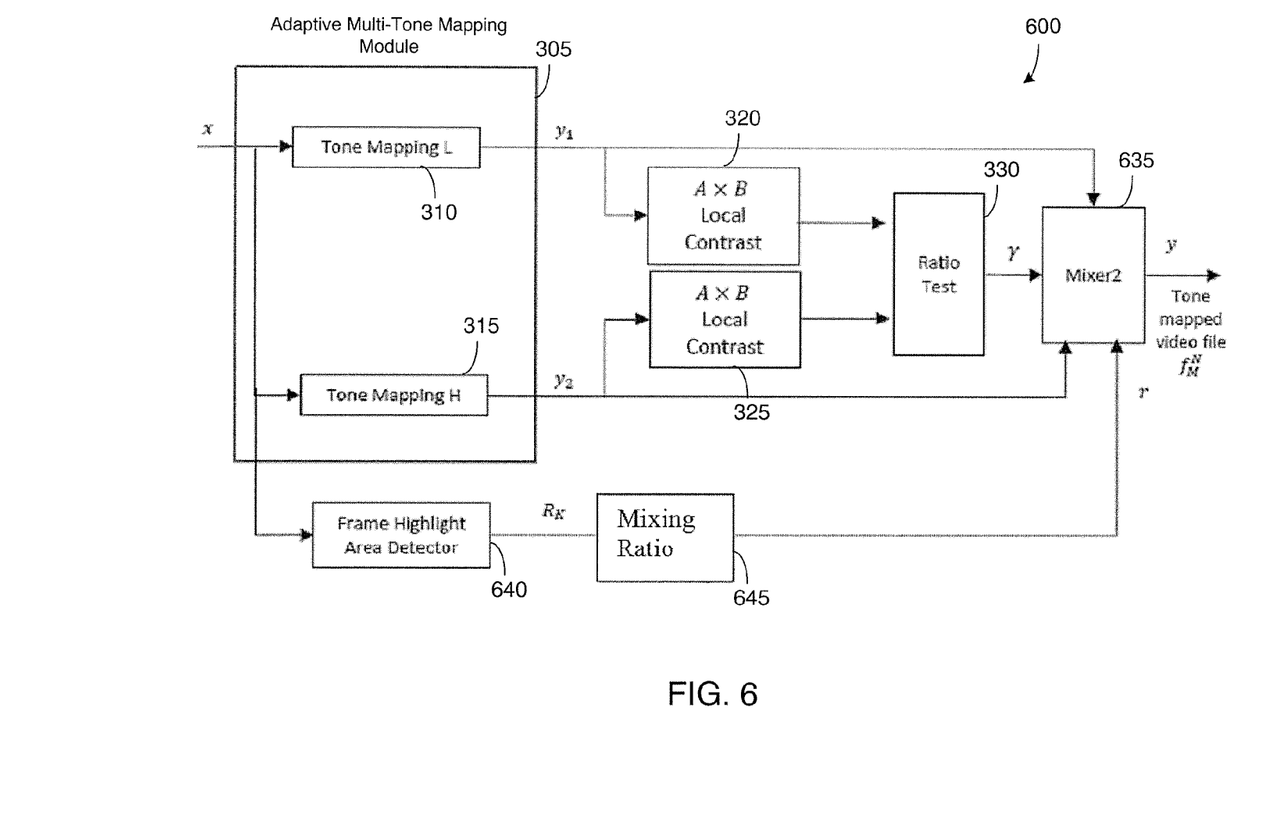
FIG. 6 illustrates a system for adaptive tone mapping based on local contrast comparison and frame highlight according to one embodiment of the present disclosure.

FIG. 6 illustrates a system 600 for adaptive tone mapping based on local contrast comparison and frame highlight according to one embodiment of the present disclosure. The system 600 may be implemented by the server 104 or the client devices 106-115 in FIG. 1. For example, any of the server 104 or the client devices 106-115 may implement the adaptive tone mapping based on local contrast techniques discussed herein to convert the mastered video file $f_M$ to the tone mapped video file $f_M^N$. In another example, the client devices 106-115 may receive the mastered video file $f_M$ from the server 104 and may implement the adaptive tone mapping based on local contrast techniques discussed herein to convert the received mastered video file $f_M$ to the tone mapped video file $f_M^N$. The embodiment of the adaptive tone mapping system 600 shown in FIG. 6 is for illustration only. Other embodiments could be used without departing from the scope of the present disclosure.

The system 600 is an example embodiment the system 300 in FIG. 3 that additionally utilizes an output from a frame highlight area detector 640 in determining the mixing of the candidate tone mapped videos. The frame highlight area detector 640 compares average or maximum values of luminance in the for areas of the input video x that are greater than a predefined constant K that is less than M to generate a value $R_K$ for amount of highlight in a frame. The mixing ratio block 645 receives and scales $R_K$ as a function of a mixing ratio curve to produce a mixing ratio r as a highlight area parameter of the video. In another example, instead of using the calculated output $R_K$ of the frame highlight detector 635, the system 600 may use scene highlight area information $S_K$ that is included in metadata sent with the mastered video file $f_M$. Additional examples of use of frame highlight area detection and scene highlight area information in tone mapping may be found in U.S. application Ser. No. 14/992,961, entitled "Tonal-Zone Adaptive Tone Mapping" filed Jan. 11, 2016, which is incorporated by reference herein.

The mixer 635 receives the ratios γ and r and generates the tone mapped output video file $f_M^N$ by mixing or combining one or more of the candidate tone mapped videos $y_1$ and $y_2$ as a function of y and r and to generate an output tone mapped video y. Equations 3-5, listed below, provide examples of different functions including minimum, maximum, and average based use of the ratios γ and r in mixing the candidate tone mapped videos $y_1$ and $y_2$.

$$y = (1 - \min(\gamma, r))y_1 + \min(\gamma, r)y_2 \quad \text{[Equation 3]}$$

$$y = (1 - \max(\gamma, r))y_1 + \max(\gamma, r)y_2 \quad \text{[Equation 4]}$$

$$y = \left(1 - \frac{\gamma + r}{2}\right)y_1 + \frac{\gamma + r}{2}y_2 \quad \text{[Equation 5]}$$

Figure 7:
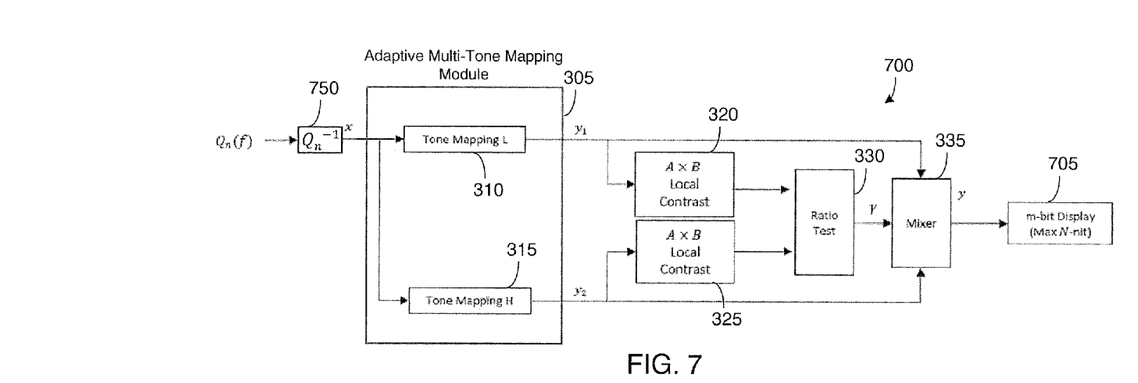
FIG. 7 illustrates a system for implementing adaptive tone mapping based on local contrast comparison on a target display according to one embodiment of the present disclosure.

FIG. 7 illustrates a system 700 for implementing adaptive tone mapping based on local contrast comparison on a target display 705 according to one embodiment of the present disclosure. The system 700 may be implemented by any one of the client devices 106-115 in FIG. 1. For example, any of the client devices 106-115 may implement the adaptive tone mapping based on local contrast techniques discussed herein to convert the mastered video file $f_M$ to the tone mapped video file $f_M^N$. The embodiment of the adaptive tone mapping system 700 shown in FIG. 7 is for illustration only. Other embodiments could be used without departing from the scope of the present disclosure.

The system 700 is an example embodiment of the system 300 in FIG. 3 that is implemented in a device that includes or is connected to the target display 705. For example, the system 700 may be any suitable visual media device, such as, but not limited to, a television, set box, cable box, peripheral, media player, computer, mobile phone, tablet, etc. The system 700 receives an n-bit quantized video file $Q_n(f)$ as an input. For example, the system 700 may receive a quantized mastered video from the server 104 over the network 102 or from a storage medium, such as a flash drive, optical disc, or other non-transitory medium. The system 700 and de-quantizes the input to generate the input video x using de-quantizer 750, for example, as discussed above with regard to FIG. 2. The system 700 generates the tone mapped video y as discussed above and displays the tone mapped video y on the m-bit target display 705. For example, the system 700 may adaptively tone map the video in advance of the display of the video while the video is being played at the target display 705.

Figure 8:
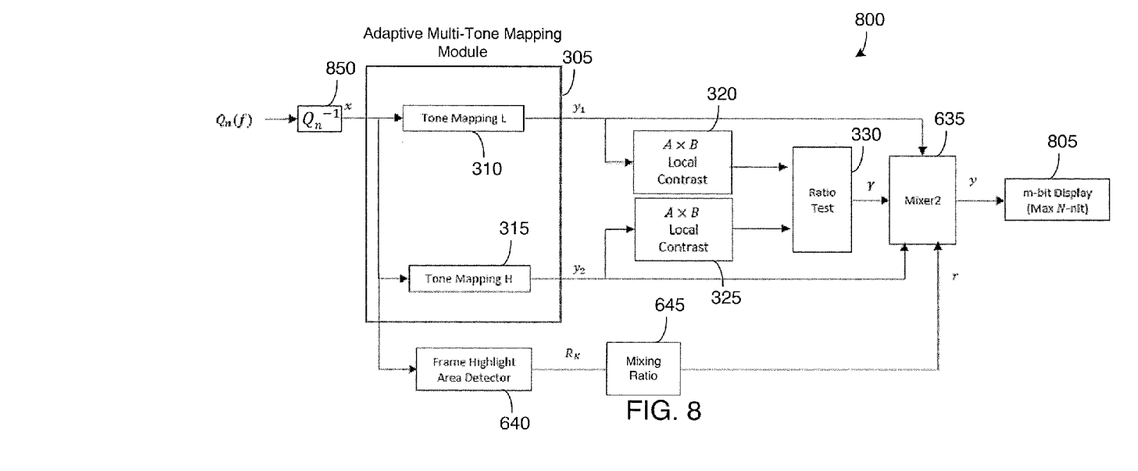
FIG. 8 illustrates a system for implementing adaptive tone mapping based on local contrast comparison and frame highlight on a target display according to one embodiment of the present disclosure.

FIG. 8 illustrates a system 800 for implementing adaptive tone mapping based on local contrast comparison and frame highlight on a target display 805 device according to one embodiment of the present disclosure. The system 800 may be implemented by any one of the client devices 106-115 in FIG. 1. For example, any of the client devices 106-115 may implement the adaptive tone mapping based on local contrast techniques discussed herein to convert the mastered video file $f_M$ to the tone mapped video file $f_M^N$. The embodiment of the adaptive tone mapping system 800 shown in FIG. 8 is for illustration only. Other embodiments could be used without departing from the scope of the present disclosure.

The system 800 is an example embodiment of the system 600 in FIG. 6 that is implemented in a device that includes or is connected to the target display 805. As discussed above, the system 800 receives an n-bit quantized video file $Q_n(f)$ as an input and de-quantizes the input to generate the input video x using de-quantizer 850, for example, as discussed above with regard to FIG. 2. The system 800 generates the tone mapped video y as discussed above and displays the tone mapped video y on the m-bit target display 805. For example, the system 800 may adaptively tone map the video in advance of the display of the video while the video is being played at the target display 805.

Figure 9:
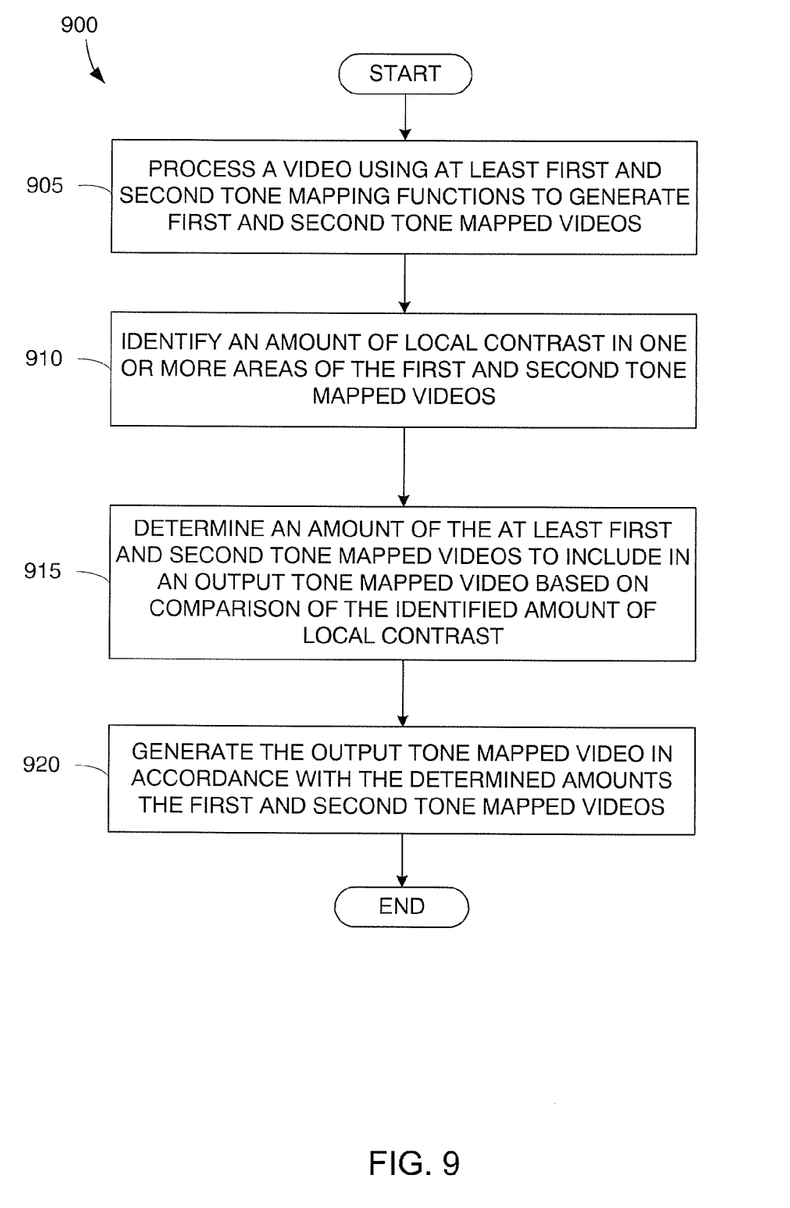
FIG. 9 illustrates an example process for video tone mapping in accordance with one embodiment of the present disclosure.

FIG. 9 illustrates an example process 900 for video tone mapping in accordance with one embodiment of the present disclosure. For example, the process 900 may be performed by the server 104 or the client devices 106-115 in FIG. 1. In particular, the process 900 can be implemented by any one of the systems 300-800 in FIG. 3-5 or 7-9 discussed above, referred to collectively here as "the system." The embodiment of the process 900 shown in FIG. 9 is for illustration only. Other embodiments could be used without departing from the scope of the present disclosure. While particular blocks of the process 900 are described below as being performed by specific blocks of one of the systems 300-500 and 700-900, it will be understood that any suitable block can perform each of the blocks of the process 900 in alternative example embodiments.

The process begins with the system processing a video using at least first and second tone mapping functions to generate first and second tone mapped videos (block 905). For example, block 905 may be implemented by block 305 in FIG. 3. In this block, the system may use different functions for tone mapping the mastered video for display on a display having a maximum luminance value that is lower than a maximum luminance value of the mastered video. For example, the system may use high and low tone mappings as discussed above with regard to FIGS. 4A-4B. In one embodiment, the video data may be from a mastered video file fM that was mastered using a mastering process, such as implemented by system 200 discussed above. In another embodiment, the video data may be from any video that has a maximum luminance level above a maximum luminance level of a target display on which the video is intended for display. In some embodiments, as part of this block or as another block, the system may also determine whether or not to apply the tone mapping. For example, the system may receive metadata associated with the video data, identify a maximum luminance value for the video data based on the metadata, and determine whether to apply tone mapping to the video data based on comparison of the maximum luminance value for the video to tone mapping criterion associated with the target display.

The system then identifies an amount of local contrast in one or more areas of the first and second tone mapped videos (block 910). For example, block 910 may be implemented by blocks 320 and 325 in FIG. 3. In this block, the amount of local contrast is a value for transitions of brightness in the one or more areas that is calculated using one or more original frames of one of the first and second tone mapped videos and a filtered portion of the one or more areas in the one of the first and second tone mapped videos.

The system determines an amount of the at least first and second tone mapped videos to include in an output tone mapped video based on comparison of the identified amount of local contrast (block 915). For example, block 915 may be implemented by block 330 in FIG. 3. In this block, the system may determine a ratio of the identified amount of local contrast in the first tone mapped video to the identified amount of local contrast in the second tone mapped video and determining the amount of the first tone mapped video and the amount of the second tone mapped video to include in the output tone mapped video as a function of the determined ratio. For example, the system may determine the amount to include based on a one of the relationships 500A-500C as discussed above with regard to FIGS. 5A-5C. As part of this block, the system may also identify a highlight area parameter of the video and determine the amount of the first tone mapped video and the amount of the second tone mapped video to include in the output tone mapped video as a function of the determined ratio and the identified highlight area parameter. For example, the system may determine the highlight area parameter as discussed above with regard to FIG. 6.

The system then generates the output tone mapped video in accordance with the determined amounts the first and second tone mapped videos (block 920). For example, block 920 may be implemented by block 335 in FIG. 3. In this block, the system may mix a portion of the first tone mapped video with a portion of the second tone mapped video. In some embodiments, the system may generate the output tone mapped video to include only one of the first and second tone mapped videos. In some embodiments, as part of this block or as another block, the system may display the generated tone mapped video on the target display. For example, the system may be included in or connected to in one of a television, a monitor, a laptop computer, a tablet computer, and a mobile phone for display of the tone mapped video.

Although FIG. 9 illustrates an example of process for video tone mapping various changes could be made to FIG. 9. For example, while shown as a series of blocks, various blocks in each figure could overlap, occur in parallel, occur in a different order, or occur multiple times.

Figure 10:
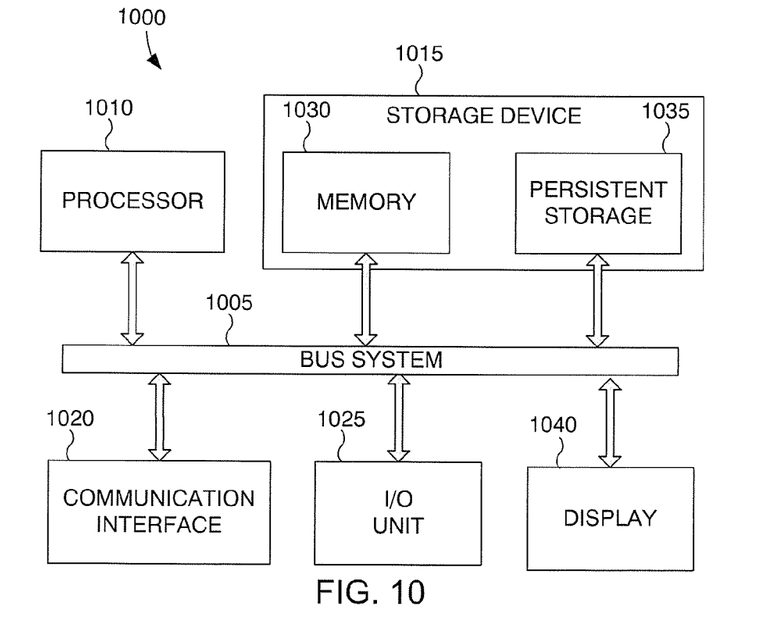
FIG. 10 illustrates an example video processing device according to this disclosure.

FIG. 10 illustrates an example video processing device 1000 according to this disclosure. In particular, the video processing device 1000 illustrates example components that may be included in any one of the server 104 or the client devices 106-115 in FIG. 1 to implement one or more embodiments of the present disclosure.

As shown in FIG. 10, the video processing device 1000 includes a bus system 1005, which supports communication between at least one processor 1010, at least one storage device 1015, at least one communication interface 1020, at least one input/output (I/O) unit 1025, and a display 1040.

The processor 1010 executes instructions that may be loaded into a memory 1030. The processor 1010 may include any suitable number(s) and type(s) of processors or other devices in any suitable arrangement. Example types of processor 1010 include microprocessors, microcontrollers, digital signal processors, field programmable gate arrays, application specific integrated circuits, and discreet circuitry. For example, the processor 1010 may implement tone mapping operations performed by any of the blocks or modules in the systems 200-800 being implemented in hardware or by executing stored instructions that causes the processor 1010 to perform the disclosed methods.

The memory 1030 and a persistent storage 1035 are examples of storage devices 1015, which represent any structure(s) capable of storing and facilitating retrieval of information (such as video data, program code, and/or other suitable information on a temporary or permanent basis). The memory 1030 may represent a random access memory or any other suitable volatile or non-volatile storage device(s). For example, the memory 1030 may contain instructions for implementing tone mapping techniques and/or may store streamed or buffered video data received from a server 104.

The persistent storage 1035 may contain one or more components or devices supporting longer-term storage of data, such as a read-only memory, hard drive, Flash memory, or optical disc. For example, the persistent storage 1035 may contain video data such as a mastered video file and metadata associated with the mastered video file.

The communication interface 1020 supports communications with other systems or devices. For example, the communication interface 1020 could include a network interface card, a cable modem, a broadcast receiver, or a wireless transceiver facilitating communications over the network 102. The communication interface 1020 may support communications through any suitable physical or wireless communication link(s).

The I/O unit 1025 allows for input and output of data. For example, the I/O unit 1025 may provide a connection for user input through a keyboard, mouse, keypad, touchscreen, or other suitable input device. The I/O unit 1025 may also send output to the display 1040, printer, or other suitable output device.

The video processing device 1000 further includes or is connected to a display 1040, such as, for example, the target displays 705 and 805. In one example embodiment, the video processing device 1000 may be video processing circuitry included in a set top box, cable box, computer, etc. connected to the display 1040 for tone mapped video to be displayed. In another example embodiment, the video processing device 1000 may be the set top box, cable box, computer, media player, etc. connected to the display 1040 for tone mapped video to be displayed. In yet another example embodiment, the video processing device 1000 may be a server connected to the target display 1040 over a network connection. In another example embodiment, the video processing device 1000 may include the display 1040 that the tone mapped video to be displayed on as well as the video processing circuitry for performing the tone mapping. For example, the video processing device 1000 may be a television, monitor, mobile phone, laptop computer, tablet computer, etc.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, block, step, or function is an essential element that must be included in the claim scope. The scope of patented subject matter is defined only by the claims. Moreover, none of the claims is intended to invoke 35 U.S.C. §112(f) unless the exact words "means for" are followed by a participle.

What is claimed is:

1. A method for video tone mapping, the method comprising:
   processing, by at least one processor, a video using at least first and second tone mapping functions to generate at least first and second tone mapped videos;
      identifying an amount of local contrast in one or more areas of each of the at least first and second tone mapped videos;
      determining an amount of each of the at least first and second tone mapped videos to include in an output tone mapped video based at least in part on comparison of the identified amount of local contrast for each of the at least first and second tone mapped videos; and
      generating the output tone mapped video in accordance with the determined amount of each of the at least first and second tone mapped videos.

2. The method of claim 1, wherein the generating of the output tone mapped video in accordance with the determined amount comprises mixing a portion of the first tone mapped video with a portion of the second tone mapped video.

3. The method of claim 1, wherein the generating of the output tone mapped video in accordance with the determined amount comprises generating the output tone mapped video to include only one of the first and second tone mapped videos.

4. The method of claim 1, wherein the determining of the amount of each of the at least first and second tone mapped videos to include in the output tone mapped video comprises:
   determining a ratio of the identified amount of local contrast in the first tone mapped video to the identified amount of local contrast in the second tone mapped video; and
   determining the amount of the first tone mapped video and the amount of the second tone mapped video to include in the output tone mapped video as a function of the determined ratio.

5. The method of claim 4, further comprising:
   identifying a highlight area parameter of the video,
   wherein determining the amount of the first tone mapped video and the amount of the second tone mapped video to include in the output tone mapped video further comprises determining the amount of the first tone mapped video and the amount of the second tone mapped video to include in the output tone mapped video as a function of the determined ratio and the identified highlight area parameter.

6. The method of claim 1, further comprising: receiving metadata associated with the video
   identifying a maximum luminance value for the video based on the metadata; and
   determining whether to apply tone mapping to the video based on comparison of the maximum luminance value for the video to tone mapping criterion associated with a target display.

7. The method of claim 1, wherein: the video is a mastered video,
   the first and second tone mapping functions are different functions for tone mapping the mastered video for display on a display having a maximum luminance value that is lower than a maximum luminance value of the mastered video, and
   the amount of local contrast is a value for transitions of brightness in the one or more areas that is calculated using one or more original frames of one of the first and second tone mapped videos and a filtered portion of the one or more areas in the one of the first and second tone mapped videos.

8. The method of claim 1, further comprising:
   displaying the output tone mapped video on a display,
   wherein the display is located in one of a television, a monitor, a laptop computer, a tablet computer, and a mobile phone.

9. An apparatus comprising:
   a memory; and
   at least one processor operably connected to the memory, the at least one processor configured to:

process a video using at least first and second tone mapping functions to generate at least first and second tone mapped videos;

identify an amount of local contrast in one or more areas of each of the at least first and second tone mapped videos;

determine an amount of each of the at least first and second tone mapped videos to include an output tone mapped video based at least in part on comparison of the identified amount of local contrast for each of the at least first and second tone mapped videos; and generate the output tone mapped video in accordance with the determined amount of each of the at least first and second tone mapped videos.

10. The apparatus of claim 9, wherein to generate the output tone mapped video in accordance with the determined amount, the at least one processor is configured to mix a portion of the first tone mapped video with a portion of the second tone mapped video.

11. The apparatus of claim 9, wherein to generate the output tone mapped video in accordance with the determined amount, the at least one processor is configured to generate the output tone mapped video to include only one of the first and second tone mapped videos.

12. The apparatus of claim 9, wherein to determine the amount of each of the at least first and second tone mapped videos to include in the output tone mapped video, the at least one processor is configured to:

determine a ratio of the identified amount of local contrast in the first tone mapped video to the identified amount of local contrast in the second tone mapped video; and determine the amount of the first tone mapped video and the amount of the second tone mapped video to include in the output tone mapped video as a function of the determined ratio.

13. The apparatus of claim 12, wherein:

the at least one processor is further configured to identify a highlight area parameter of the video, and to determine the amount of the first tone mapped video and the amount of the second tone mapped video to include in the output tone mapped video, the at least one processor is configured to determine the amount of the first tone mapped video and the amount of the second tone mapped video to include in the output tone mapped video as a function of the determined ratio and the identified highlight area parameter.

14. The apparatus of claim 9, further comprising:

a communication interface configured to receive metadata associated with the video; wherein the at least one processor is further configured to:

identify a maximum luminance value for the video based on the metadata; and determine whether to apply tone mapping to the video based on comparison of the maximum luminance value for the video to tone mapping criterion associated with a target display.

15. The apparatus of claim 9, wherein:

the video is a mastered video, the first and second tone mapping functions are different functions for tone mapping the mastered video for display on a display having a maximum luminance value that is lower than a maximum luminance value of the mastered video, and the amount of local contrast is a value for transitions of brightness in the one or more areas that is calculated using one or more original frames of one of the first and second tone mapped videos and a filtered portion of the one or more areas in the one of the first and second tone mapped videos.

16. The apparatus of claim 9, further comprising:

a display configured to display the output tone mapped video, wherein the apparatus is one of a television, a monitor, a laptop computer, a tablet computer, and a mobile phone.

17. A non-transitory computer readable medium comprising program code, that when executed by at least one processor, causes the at least one processor to:

process a video using at least first and second tone mapping functions to generate at least first and second tone mapped videos;

identify an amount of local contrast in one or more areas of each of the at least first and second tone mapped videos;

determine an amount of each of the at least first and second tone mapped videos to include in an output tone mapped video based at least in part on comparison of the identified amount of local contrast for each of the at least first and second tone mapped videos; and generate the output tone mapped video in accordance with the determined amount of each of the at least first and second tone mapped videos.

18. The computer readable medium of claim 17, wherein the program code, that when executed by the at least one processor, causes the at least one processor to generate the output tone mapped video in accordance with the determined amount, comprises program code, that when executed by the at least one processor, causes the at least one processor to mix a portion of the first tone mapped video with a portion of the second tone mapped video.

19. The computer readable medium of claim 17, wherein the program code, that when executed by the at least one processor, causes the at least one processor to determine the amount of each of the at least first and second tone mapped videos to include in the output tone mapped video, comprises program code, that when executed by the at least one processor, causes the at least one processor to:

determine a ratio of the identified amount of local contrast in the first tone mapped video to the identified amount of local contrast in the second tone mapped video; and determine the amount of the first tone mapped video and the amount of the second tone mapped video to include in the output tone mapped video as a function of the determined ratio.

20. The computer readable medium of claim 19, wherein the program code is further configured to, when executed by the at least one processor, causes the at least one processor to:

identify a highlight area parameter of the video, wherein the program code, that when executed by the at least one processor, causes the at least one processor to determine the amount of the first tone mapped video and the amount of the second tone mapped video to include in the output tone mapped video, comprises program code, that when executed by the at least one processor, causes the at least one processor to determine the amount of the first tone mapped video and the amount of the second tone mapped video to include in the output tone mapped video as a function of the determined ratio and the identified highlight area parameter.

* * * * *